(12) United States Patent
Gutierrez et al.

(10) Patent No.: US 8,717,990 B2
(45) Date of Patent: May 6, 2014

(54) METHOD AND APPARATUS FOR TRANSMITTING AND RECEIVING DATA INCLUDING A PLURALITY OF DATA STREAMS IN A BROADCASTING/COMMUNICATION SYSTEM

(75) Inventors: Ismael Gutierrez, Staines (GB); Alain Mourad, Staines (GB); Sung-Ryul Yun, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 80 days.

(21) Appl. No.: 13/153,905

(22) Filed: Jun. 6, 2011

(65) Prior Publication Data
US 2011/0299493 A1 Dec. 8, 2011

(30) Foreign Application Priority Data
Jun. 4, 2010 (GB) .................................. 1009447.2

(51) Int. Cl.
| | | |
|---|---|---|
| H04W 72/04 | (2009.01) | |
| H04H 20/42 | (2008.01) | |
| H04H 20/71 | (2008.01) | |
| H04H 20/30 | (2008.01) | |
| H04L 27/26 | (2006.01) | |
| H04L 5/00 | (2006.01) | |

(52) U.S. Cl.
CPC ............... *H04H 20/42* (2013.01); *H04H 20/71* (2013.01); *H04H 20/30* (2013.01); *H04L 27/2602* (2013.01); *H04L 5/0044* (2013.01); *H04L 5/0053* (2013.01)
USPC ....................................................... 370/329

(58) Field of Classification Search
USPC .................. 370/329–330, 431–463, 203–211
See application file for complete search history.

(56) References Cited

U.S. PATENT DOCUMENTS

| | | | |
|---|---|---|---|
| 8,265,096 B2* | 9/2012 | Zheng et al. .................. 370/473 |
| 2002/0118666 A1* | 8/2002 | Stanwood et al. ............ 370/345 |
| 2005/0141539 A1 | 6/2005 | Hamilton et al. |
| 2006/0083253 A1 | 4/2006 | Park et al. |
| 2007/0058595 A1* | 3/2007 | Classon et al. ................ 370/337 |
| 2008/0075032 A1 | 3/2008 | Balachandran et al. |
| 2009/0016371 A1 | 1/2009 | Zheng et al. |

(Continued)

FOREIGN PATENT DOCUMENTS

| | | |
|---|---|---|
| EP | 2 093 908 | 8/2009 |
| EP | 2 187 556 | 5/2010 |

OTHER PUBLICATIONS

Eddy Kwon et al., "Multi-Zone Based Flexible Sub-Slicing", Digital Video Broadcasting, Mar. 3, 2008.

(Continued)

*Primary Examiner* — Mark Rinehart
*Assistant Examiner* — Kenneth P Hunt
(74) *Attorney, Agent, or Firm* — The Farrell Law Firm, P.C.

(57) ABSTRACT

A method of transmitting data comprising a plurality of data streams in a broadcasting system is provided. The method includes dividing a frame into a plurality of physical layer zones, allocating the plurality of data streams to the plurality of physical layer zones, allocating signaling information associated with the plurality of physical layers to at least one of the plurality of physical layer regions, and transmitting the frame to which the signaling information is allocated.

20 Claims, 11 Drawing Sheets

(56) References Cited

U.S. PATENT DOCUMENTS

| | | |
|---|---|---|
| 2009/0059859 A1* | 3/2009 | Kuze et al. ............... 370/329 |
| 2009/0196217 A1* | 8/2009 | Himmanen et al. ......... 370/328 |
| 2009/0232071 A1* | 9/2009 | Cho et al. ............... 370/329 |
| 2010/0046445 A1 | 2/2010 | Sawahashi et al. |
| 2010/0278123 A1* | 11/2010 | Fong et al. .............. 370/329 |
| 2010/0310022 A1* | 12/2010 | Asjadi .................. 375/343 |

OTHER PUBLICATIONS

DVB Organization: "DVB-NGH: Call for Technologies. T2-4-NGH Proposal", Digital Video Broadcasting, Mar. 19, 2010.

\* cited by examiner

METHOD AND APPARATUS FOR TRANSMITTING AND RECEIVING DATA INCLUDING A PLURALITY OF DATA STREAMS IN A BROADCASTING/COMMUNICATION SYSTEM

PRIORITY

This application claims priority under 35 U.S.C. §119(a) to a United Kingdom Patent Application filed in the United Kingdom Intellectual Property Office on Jun. 4, 2010 and assigned Serial No. GB 1009447.2, the entire content of which is incorporated herein by reference.

BACKGROUND OF THE INVENTION

1. Field of the Invention

The present invention relates generally to broadcasting/communication systems, and more particularly, to a method and apparatus for transmitting and receiving data including a plurality of data streams by multiplexing different efficiency modes in broadcasting/communication systems.

2. Description of the Related Art

Modern broadcasting/communication systems typically employ physical layer configurations for transmitting data that have a variety of parameters, which are typically chosen at the system design stage, as a compromise between efficiency in relation to system capacity and robustness in terms of expected reception conditions. For example, a physical layer configuration characteristic may relate to a number of subcarriers used by a multicarrier transmission scheme, a multiple antenna scheme such as a Multiple-Input, Multiple Output (MIMO) scheme, a guard interval between symbols to allow for settling of multipath, and/or a distribution of pilot signals within transmitted symbols. Such physical layer configuration characteristics are typically uniform within each entire individual symbol of a transmission, and therefore, such characteristics may be called macro-configuration characteristics.

Wireless systems involving uni-cast transmission and a reverse link, such as a cellular wireless communication system or a wireless access system such as Institute of Electrical and Electronics Engineers (IEEE) 802.16 Wimax, may employ adaptive modulation and coding in order to optimize settings according to the trade-off between efficiency in relation to system capacity and robustness in terms of expected reception conditions for a given user; the reverse link, or uplink, may be used to communicate the signal reception conditions for a given user to a base station, and the communication system may choose an appropriate modulation and coding scheme for each user, that may be adapted as conditions change. A modulation scheme may for example relate to a Quadrature Amplitude Modulation (QAM) constellation size, and a coding scheme may relate to a coding rate or code word length; either or both of which may vary between subcarriers of a symbol in a multicarrier system such as Orthogonal Frequency-Division Multiplexing (OFDM). A modulation and coding scheme may be referred to a micro-configuration characteristic. Typically, in cellular wireless communication systems and wireless access systems, macro-configuration characteristics are the same among different users, and the micro-configurations may be adapted on per-user basis, in cases where the system allows such configurations.

Unidirectional broadcast systems typically transmit signals that may potentially be received by any user. Unidirectional broadcast systems also lack a reverse link. Therefore, adaptive modulation and coding is not typically employed in unidirectional broadcast systems.

Digital Video Broadcasting (DVB) systems, such as second generation of DVB systems known as DVB-Terrestrial 2 (DVB-T2), DVB-Cable 2 (DVB-C2) and future DVB-Next Generation Handheld (DVB-NGH) systems typically use OFDM modulation. Different configurations (e.g. Fast Fourier Transform (FFT) sizes, guard intervals, pilot patterns, etc.) are usually specified in these systems, each intended to achieve a given efficiency for a given deployment scenario. Network operators then have options for selecting the best configurations suitable for various deployment scenarios. Although broadcast systems cannot adapt dynamically to the users' instantaneous reception conditions, the concept of Physical Layer Pipes (PLPs) with different levels of efficiency and robustness, typically in terms of modulation and coding scheme, has been introduced in the $2^{nd}$ generation DVB systems. Such systems are able to offer different levels of Quality of Service (QoS) as required for the transport of the different kinds of services in the system. However, in such systems each user of a service is provided with a signal with the same modulation and coding scheme for the service, as well as the same macro-configuration of the physical layer. Trade-offs between efficiency in relation to system capacity and robustness in terms of reception conditions are therefore typically set as a compromise value for all users.

SUMMARY OF THE INVENTION

Accordingly, an aspect of the present invention is to ameliorate the problems with the prior art systems.

According to an aspect of the present invention, a method of transmitting data comprising a plurality of data streams in a broadcasting system is provided. The method includes dividing a frame into a plurality of physical layer zones, allocating the plurality of data streams to the plurality of physical layer zones, allocating signaling information associated with the plurality of physical layers to at least one of the plurality of physical layer regions, and transmitting the frame to which the signaling information is allocated.

According to another aspect of the present invention, an apparatus for transmitting data comprising a plurality of data streams in a broadcasting system is provided. The apparatus includes a scheduler for dividing a frame into a plurality of physical layer zones, allocating the plurality of data streams to the plurality of physical layer zones, and allocating signaling information associated with the plurality of physical layers to at least one of the plurality of physical layer regions and a transmitter for transmitting the frame to which the signaling information is allocated.

According to another aspect of the present invention, there is provided a method of receiving data comprising a plurality of data streams in a broadcasting system, the frame being divided into a plurality of physical layer zones, the plurality of data streams being allocated to the plurality of physical layer zones, and signaling information associated with the plurality of physical layers being allocated to at least one of the plurality of physical layer regions. The method includes receiving the frame and receiving the plurality of data streams by using the signaling information.

According to another aspect of the present invention, there is provided an apparatus for receiving data comprising a plurality of data streams in a broadcasting system, the frame being divided into a plurality of physical layer zones, the plurality of data streams being allocated to the plurality of physical layer zones, and signaling information associated with the plurality of physical layers being allocated to at least one of the plurality of physical layer regions. The apparatus receives the frame and receives the plurality of data streams by using the signaling information.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF EMBODIMENTS OF THE PRESENT INVENTION

Embodiments of the present invention are described in detail herein with reference to the accompanying drawings. In the following description, specific details such as detailed configuration and components are provided to assist the overall understanding of the embodiments of the present invention. Therefore, it should be apparent to those skilled in the art that various changes and modifications of the embodiments described herein can be made without departing from the scope and spirit of the invention. Additionally, descriptions of well-known functions and constructions are omitted for clarity and conciseness.

Embodiments of the invention are described herein with respect to a digital video unidirectional broadcasting system, and in particular, a digital video unidirectional broadcasting system using Orthogonal Frequency Division Multiplexing (OFDM) (i.e., a multicarrier transmission system).

However, it will be understood that the multicarrier transmission system referred to herein is merely provided as an example, and that other embodiments may involve other wireless systems may be provided in accordance with embodiments of the present invention. More specifically, embodiments of the present invention are not limited to the use of unidirectional broadcasting, transmission of digital video signals, or OFDM. Embodiments of the invention are also applicable to single carrier unidirectional broadcast systems.

Figure 1:
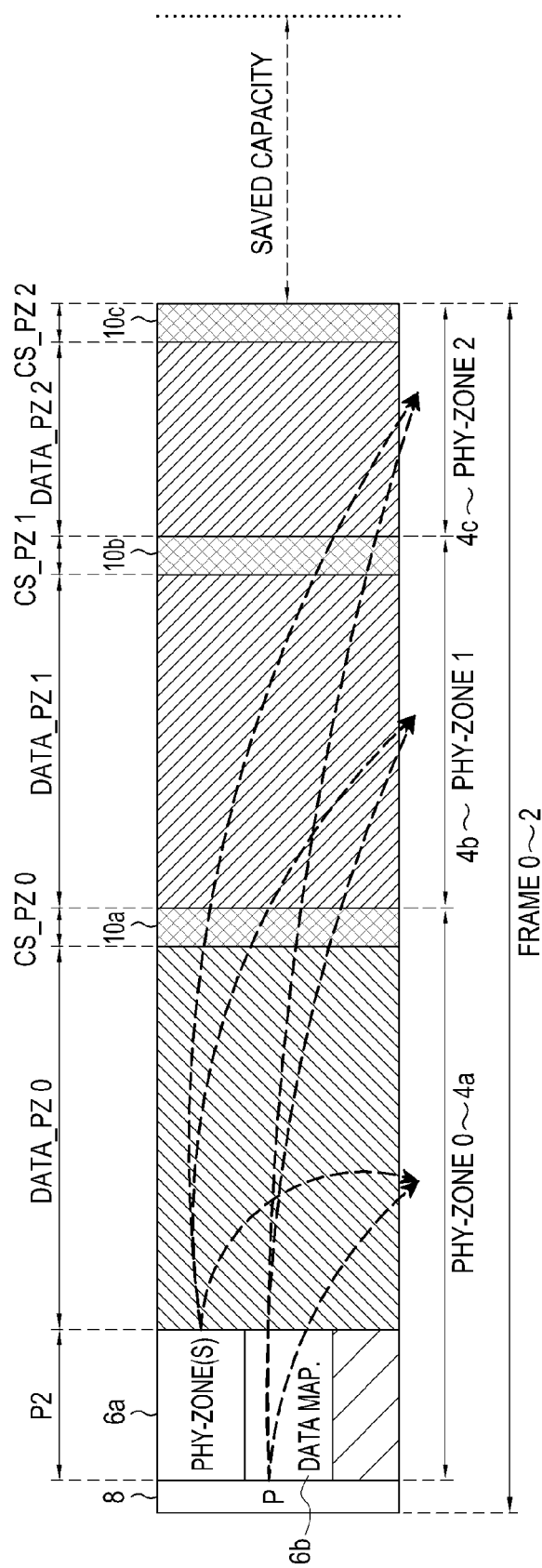
FIG. 1 is a is a schematic diagram illustrating a data frame according to an embodiment of the invention.

FIG. 1 shows a data frame 2 according to an embodiment of the invention. The frame includes a plurality of time-multiplexed physical layer zones 4a, 4b, and 4c. Each zone includes data for transmission using a plurality of symbols.

In a digital video unidirectional broadcasting systems such a DVB-T2, the symbols are typically OFDM symbols, and the vertical axis of FIG. 1 represents data assigned to a number of subcarriers of an OFDM symbol. The subcarriers may be interleaved, so that the vertical axis may correspond to a logical arrangement of subcarriers rather than an ordering in terms of subcarrier frequency. The horizontal axis of FIG. 1 corresponds to time, and represents a data carried by a succession of OFDM symbols.

At least a first physical layer configuration characteristic is applied uniformly to each of the symbols within a respective zone, the first physical layer configuration characteristic being different in different respective zones. According to the embodiment of the present invention described with reference to FIG. 1, the first physical layer configuration relates to a number of subcarriers, such that a uniform transform size is typically applied to each symbol in a zone, such that symbols in each zone have the same number of subcarriers. Alternatively or additionally, a guard period and/or multiple antenna transmission schemes, such as a Multiple-Input Multiple Output (MIMO) scheme, and/or a pilot signal pattern may vary between zones, and may be applied uniformly to each of the symbols within a respective zone.

Accordingly, each physical layer zone 4a, 4b, 4c, which may also be referred to as a PHY-zone, may have a physical layer configuration characteristic, or characteristics, with a different efficiency in relation to system capacity and a different robustness in relation to reception conditions. In particular, if a symbol has a larger transform size (i.e., a larger number of subcarriers) the symbol will typically have a greater capacity to carry data, but at the expense of a greater sensitivity to poor reception conditions, and in particular reception conditions associated with mobile receivers. Similarly, a longer guard period between symbols typically provides a greater resistance to multipath, but at the expense of data capacity. A pilot signal or pilot tone pattern or distribution that has a higher proportion of pilot subcarriers to payload data subcarriers will similarly have a greater robustness, due to a potential for more accurate channel equalisation, at the expense of data capacity. A MIMO scheme may be optimized to provide robust transmission, for example using Alamouti coding that may exploit diversity transmitting the same data, appropriately coded, on orthogonal transmission paths, or to provide greater capacity by using orthogonal paths to carry different data.

The provision of physical layer zones having different physical layer characteristics, typically macro-characteristics applying uniformly to an entire symbol, with different trade-offs between spectral efficiency and robustness allows receivers to select physical layer zones to receive that are appropriate to the reception conditions at the receiver, the capabilities of the receiver (e.g., a capability to receive MIMO transmissions that may be based on a number of antennas), or the requirements of the user, such as may be related to the selection of a service.

Typically, the physical layer zones may be arranged in order of decreasing robustness. For example, referring to FIG. 1, physical layer zone PHY_zone$_0$ 4a is arranged to have a greater robustness than PHY_zone$_1$ 4b, which may itself have a greater robustness than PHY_zone$_2$ 4c.

Figure 11:
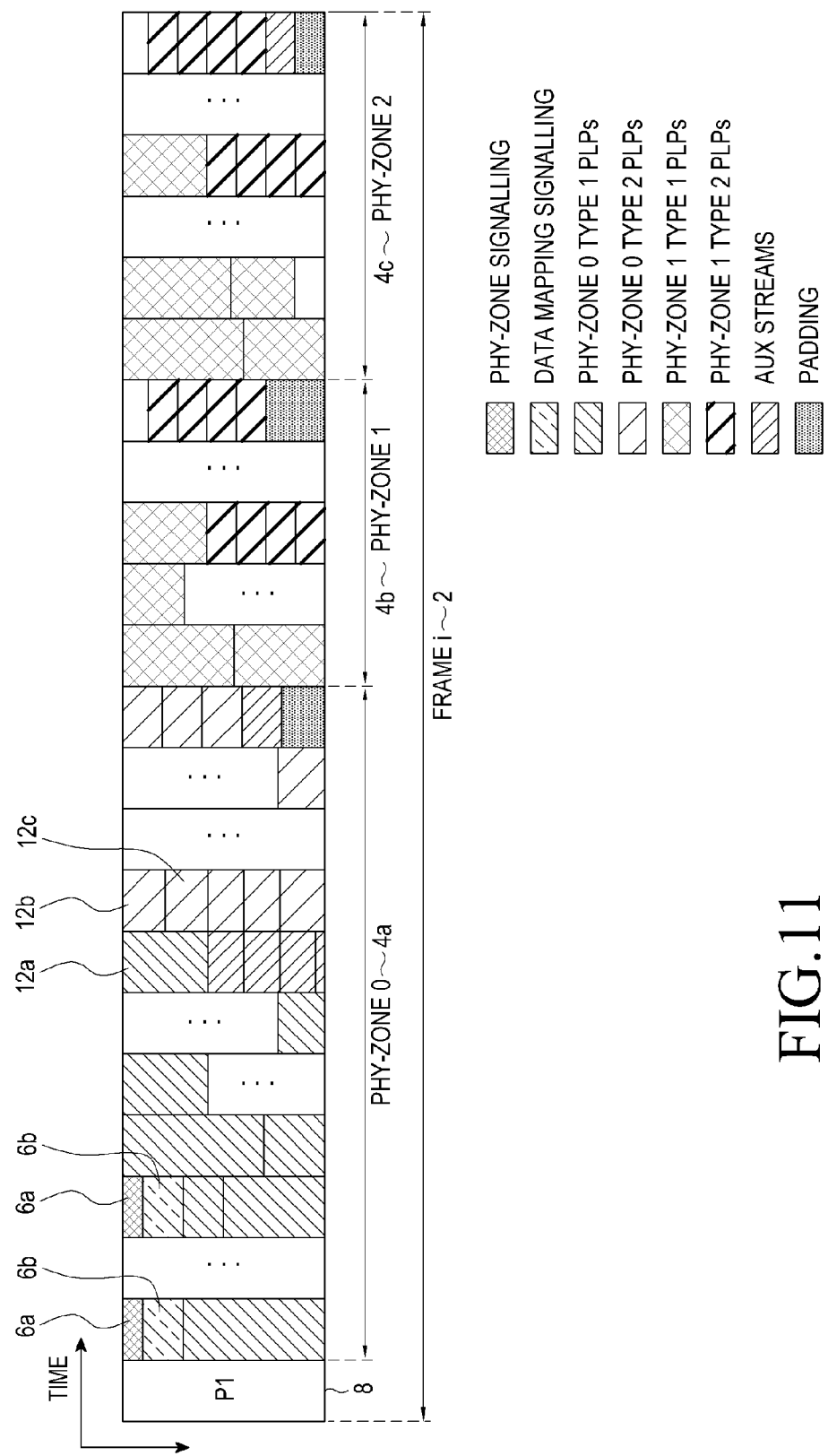
FIG. 11 is a schematic diagram illustrating a data frame according to an embodiment of the invention.

Signaling data 6a and 6b are typically transmitted within the first physical layer zone 4a, so that that the signaling data will have a high probability of being receivable by different types of receivers having different reception conditions. The signaling data typically carries zone-related signaling data 6a indicating at least one characteristic of each physical layer zone, such as the number of sub-carriers, MIMO scheme, or a guard period or interval, such as a cyclic prefix length. The signaling may indicate a location of the physical layer zone within the frame, and/or a physical layer configuration applied to a physical layer zone. The signaling data may also indicate an assignment of data streams, which may carry services or service components carried by the frame, to a zone or zones, that is to say to a physical layer zone or zones. FIG. 11 illustrates a variant of a data frame according to an embodiment of the invention.

It can be seen from FIG. 11 that the frame may include a number of physical layer sections 12a, 12b, 12c that may be referred to as Physical Layer Pipes (PLPs). According to embodiments of the present invention, in the PLPs or the physical layer sections, the same modulation and coding scheme is applied to data, and each physical layer section may include at least one part of at least one of the physical layer zones, and each section may include data for transmission using the same modulation and/or coding scheme (i.e., the same physical layer micro-characteristic), within a section. For example, the modulation may vary between sections in terms of QAM constellation size, and the coding may vary in terms of code rate or code word length, or indeed forward error correction coding type. Data streams are typically allocated to physical layer pipes (i.e., sections) appropriately to a service type or component that is carried by the data stream. For example, high definition video may be allocated to a sector, as well as to a zone, that offers high spectral efficiency and, therefore, a high capacity, while lower definition video may be allocated to a sector and/or zone offering higher robustness but lower capacity, such as may be required by a mobile receiver with a smaller screen and more challenging reception conditions.

Accordingly, data for transmission includes a number of data streams that may correspond to services or service components. Each of the data streams is assigned to at least one of the zones. As shown in FIG. 1, signaling data 6a and 6b are included in the frame, and more specifically, in this case, within the first zone. Zones are typically arranged in order of decreasing robustness, which according this embodiment of the present invention, corresponds to increasing numbers of subcarriers per symbol. Therefore, it is advantageous to include the signaling data within the first frame, in order to achieve the greatest probability of successful reception. The signaling data includes zone-related signaling data indicating at least one characteristic of a physical layer zone within the frame and of the assignment of data streams to zones. This inclusion allows the receiver to select the appropriate parts of the frame for reception according to capabilities of the receiver and signal conditions, and further allows the receiver to be configured appropriately for the zone to be received. Therefore, in this case, an appropriate Fast Fourier Transform (FFT) size may be selected for reception of a symbol.

According to this embodiment of the present invention, each of the time-multiplexed physical layer zones has a first physical layer configuration characteristic with a different efficiency in relation to system capacity and a different robustness in relation to reception conditions. This arrangement allows the overall efficiency of the wireless communication system to be improved by allowing for efficient multiplexing of different physical layer configuration characteristics having different levels of efficiency in the same frame. This improvement is particularly relevant to mobile broadcasting systems, as these systems cannot adapt dynamically to the different users' reception conditions (mainly dictated by both their channel conditions and receiver capabilities). Therefore, generally one single efficiency physical layer configuration or mode cannot achieve the best trade-off between efficiency and robustness.

As shown in FIG. 1, each physical layer data zone is defined by at least a closing symbol 10a, 10b, or 10c at an end of the zone. The closing symbol typically includes a pilot pattern for use in channel estimation at the receiver. This pilot pattern may be used for channel estimation within the preceding zones, and in following zones, as appropriate, by interpolation between pilot tones or a pilot pattern in the preamble 8, or in other closing symbols, as appropriate.

Therefore, embodiments of the present invention using the frame structure of FIG. 1 may allow for an efficient multiplexing of different configurations at different levels of efficiency in the same signal. For example, with two efficiency modes, namely Standard Efficiency Mode (SEM) and High Efficiency Mode (HEM), an embodiment of the present invention can have an SEM mode oriented towards best performance for standard reception conditions (i.e. standard receivers and tolerable channel conditions), and an HEM mode oriented towards higher efficiency for suitable reception conditions (thanks to higher capability of the receivers or better channel conditions (e.g., low mobility)). This HEM mode will therefore carry HEM services that can be accessed by a certain class of receivers or standard receivers under certain suitable channel conditions. The user measuring reception conditions will then be able to consume the desired services in SEM and/or HEM modes according to the measured reception conditions. The HEM mode can carry, for example, service components such as Enhancement layers of Scalable Video Coding (SVC), or services solely destined to a class of sophisticated receivers or other services (e.g., low priority services). Accordingly, different efficiency modes are provided in addition to an efficient way to handle signaling, in particular by combining the signaling for each zone in a single part of the frame arranged to carry at least signaling data, so that an overall gain in efficiency may be realized.

Figure 2:
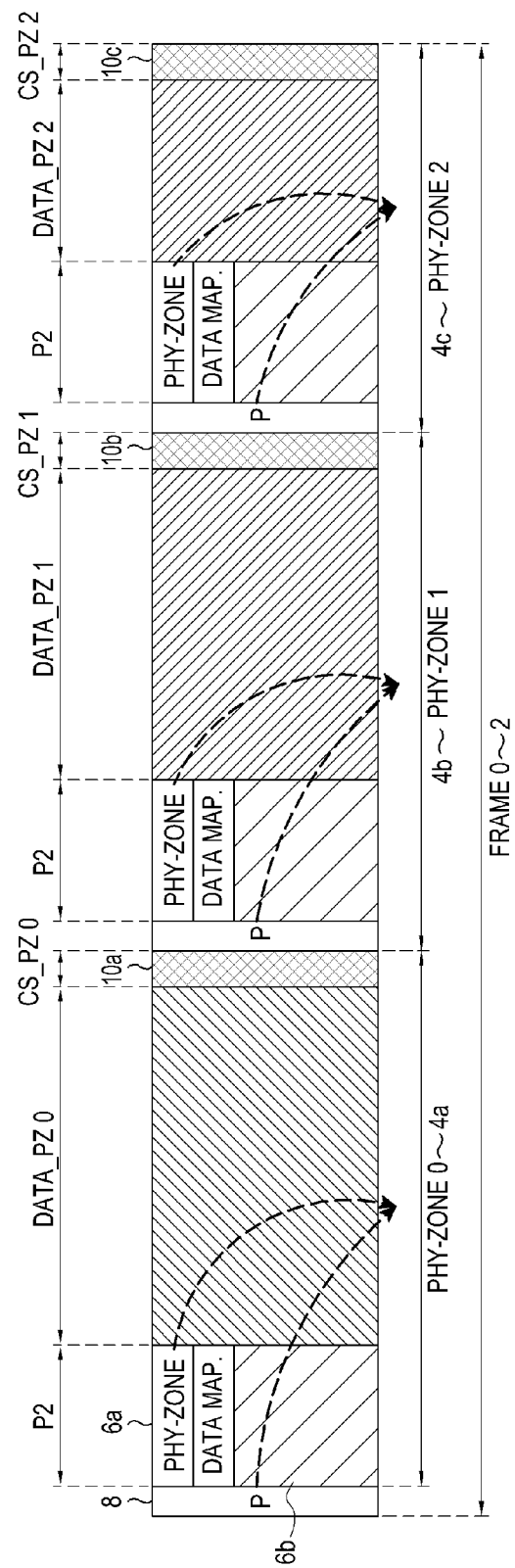
FIG. 2 is a schematic diagram illustrating data frames according to an embodiment of the invention.

FIG. 2 illustrates an alternative embodiment of the invention in which the PHY-zones are separated in time for both the signaling and data. While signaling information for all physical layer zones is included in the first part (i.e., the front part) of the first PHY zone in FIG. 1, signaling information for each physical layer zone is included in the front part of the corresponding physical layer zone in FIG. 2. The efficiency of signaling handling according to this embodiment may be somewhat lower than that which may be achieved in the embodiment of FIG. 1, due to the extra capacity required for the signaling arrangement illustrated in FIG. 2.

Referring to FIG. 2, two or more of the physical layer zones may be generated by synchronised transmitters of different types, or at different locations. For example, one zone may be provided by a terrestrial transmitter while another zone is provided by a satellite transmitter. A receiver may then decide whether to receive one or both zones according to requirements of the receiver and signal reception conditions. The receiver may select a zone according to the signaling data, which is typically contained in the first, most robust zone.

Figure 3:
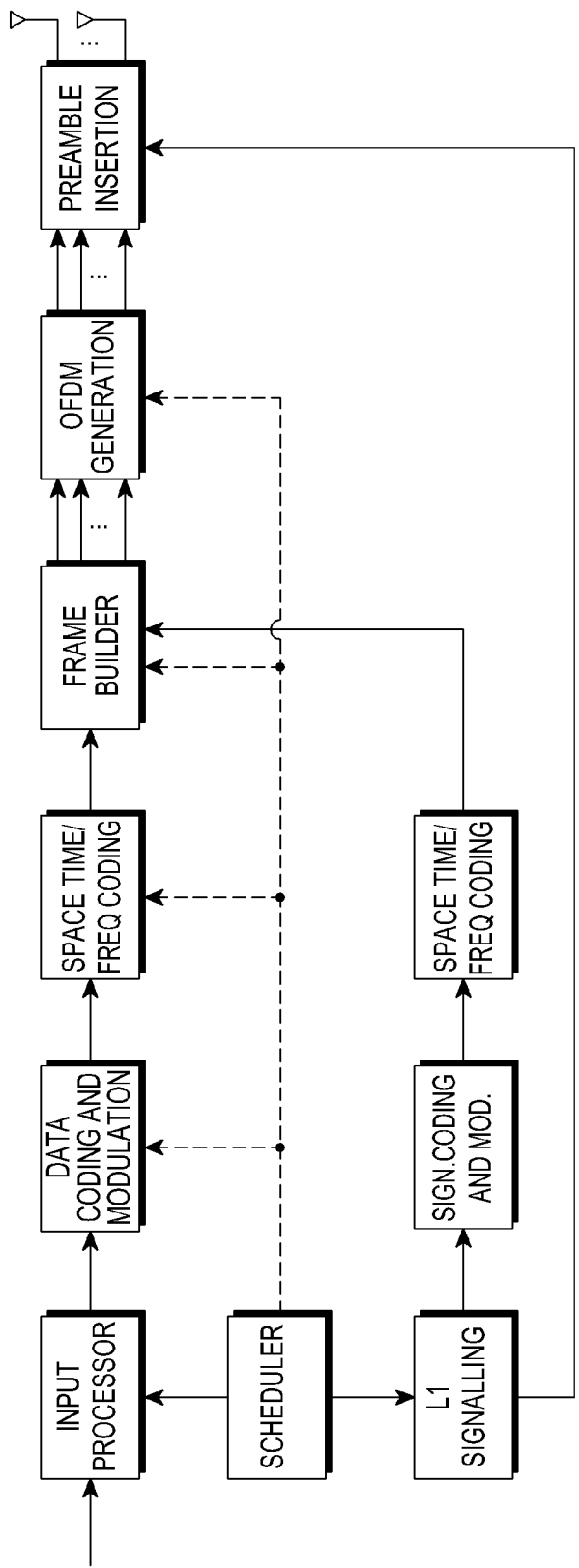
FIG. 3 is a schematic diagram illustrating a conventional transmitter.
Figure 9:
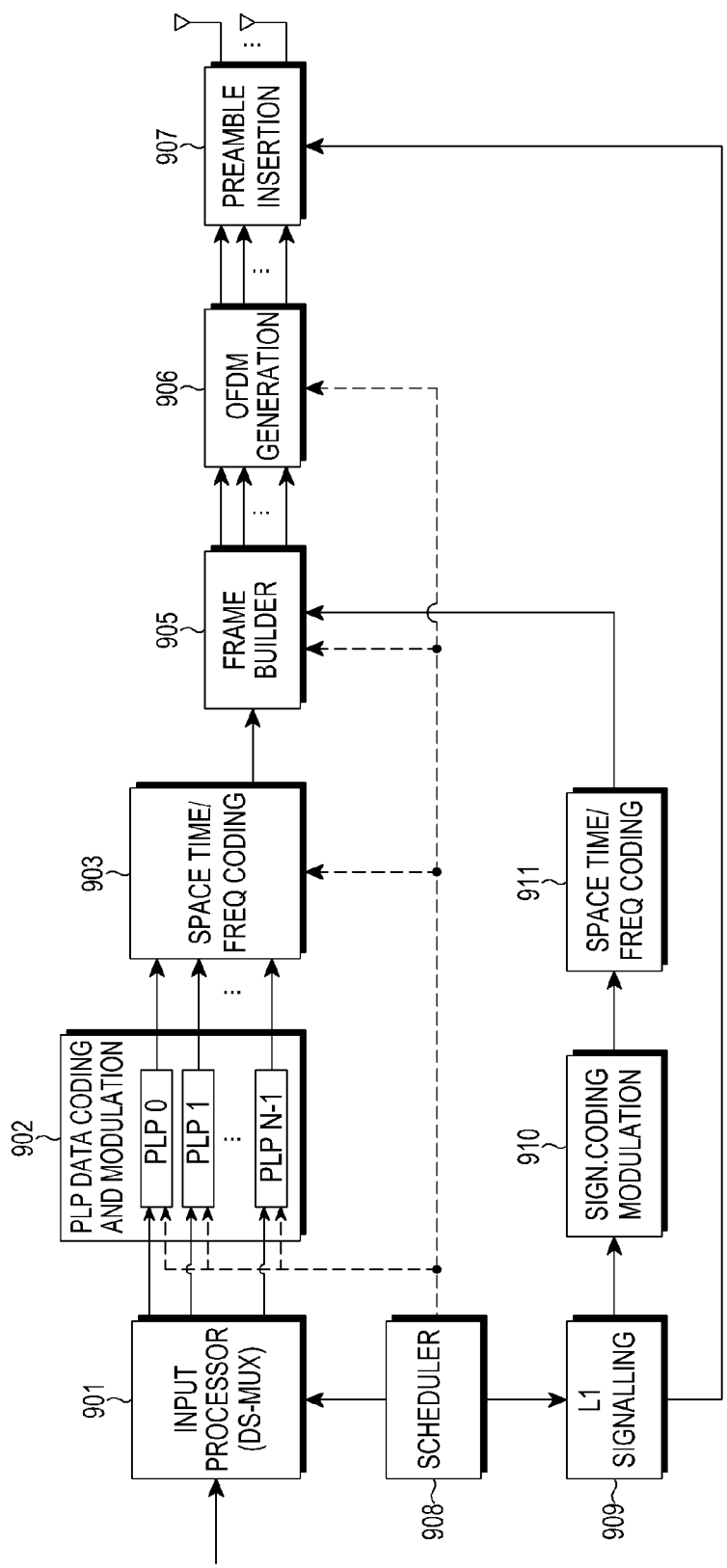
FIG. 9 is a schematic diagram illustrating a conventional transmitter.

FIG. 3 illustrates an example of a reference transmitter conventionally used in digital broadcasting systems. More specifically, FIG. 3 illustrates the different key blocks responsible for the multiplexing and transmission of the services together with their signaling over the channel. FIG. 9 illustrates a conventional reference transmitter in more detail.

Referring to FIG. 9, data input to an input processor 901 is demultiplexed and output to a data coding and modulation unit 902 to be allocated to PLPs PLP 0, PLP 1, . . . , PLP (N−1). The data allocated to the PLPs are coded and modulated according to different coding and modulation schemes for the respective PLPs and then input to a space-time/frequency coder 903 to be space-time/frequency coded. A frame builder 905 then builds a frame by using the space-time/frequency coded data and outputs the frame to an OFDM generator 906, which then generates an OFDM symbol and outputs the same to a preamble inserter 907. The preamble inserter 907 generates a preamble in the OFDM symbol and transmits the preamble.

A scheduler 908 controls coding and modulation, space-time/frequency coding, frame building, OFDM generation, etc. More specifically, the scheduler 908 generates scheduling information for data transmission and outputs the scheduling information to the input processor 901, the data coding and modulation unit 902, the space-time/frequency coder 903, the frame builder 905, and the OFDM generator 906 to control corresponding entities. The scheduling information, after transferred to an L1 signaling unit 909, is coded and modulated in a signal coding and modulation unit 910, space-time/frequency coded in a space-time/frequency coder 911, and then transferred to the frame generator 905 to be included in the frame.

Figure 4:
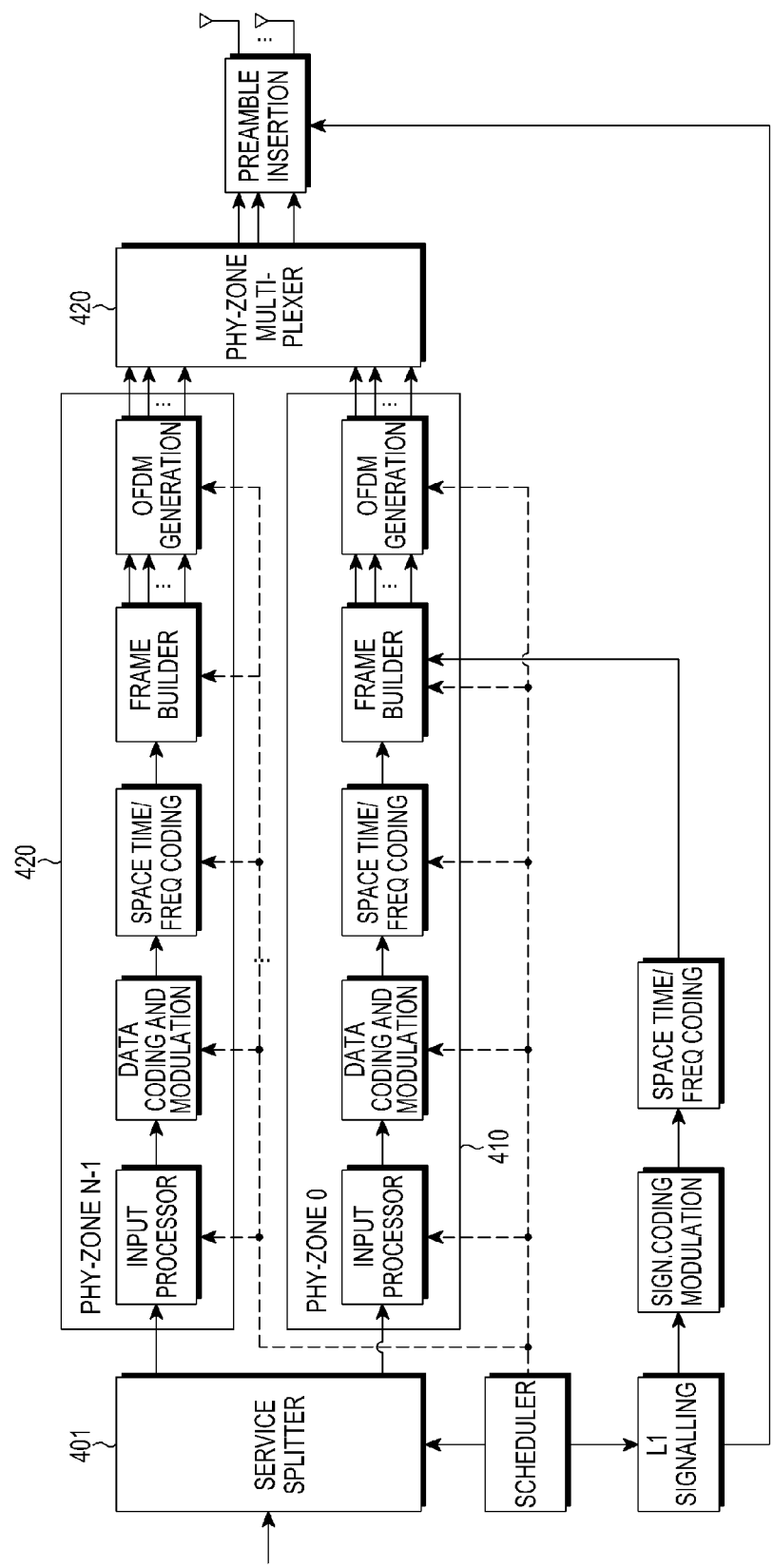
FIG. 4 is a schematic diagram illustrating a transmitter according to an embodiment of the invention.

In contrast to the reference transmitter of FIG. 9, FIG. 4 depicts an example of a transmitter as according to an embodiment of the present invention.

Referring to FIG. 4, in a transmitter according to an embodiment of the present invention includes a service splitter 401 for properly mapping the services to PHY zones corresponding to the respective efficiency modes. The services mapped to the PHY zones by the service splitter 401 are input to processors 410 and 420 of the corresponding PHY zones. The detailed configurations of the PHY zone processors 410 and 420 are the same as entities shown in FIG. 9 and therefore, will not be described herein. The services processed by the PHY zone processors 410 and 420 are multiplexed by a PHY zone multiplexer 420.

Each efficiency mode is associated with a PHY (physical layer) zone representative of the PHY configuration necessary to achieve the targeted efficiency. As a key distinctive configuration parameter of the PHY-zone, the invention uses PHY parameters that have direct impact on the trade-off between performance (for example in terms of robustness) and efficiency. For example, the parameters may include the FFT (Fast Fourier Transform) size of the OFDM (Orthogonal Frequency Division Multiplexing) modulation, which, for higher values, may result in higher efficiency but lower performance in a mobile environment. The parameters may include other key PHY parameters such as the MIMO (multiple-input, multiple-output) scheme employed.

Figure 10:
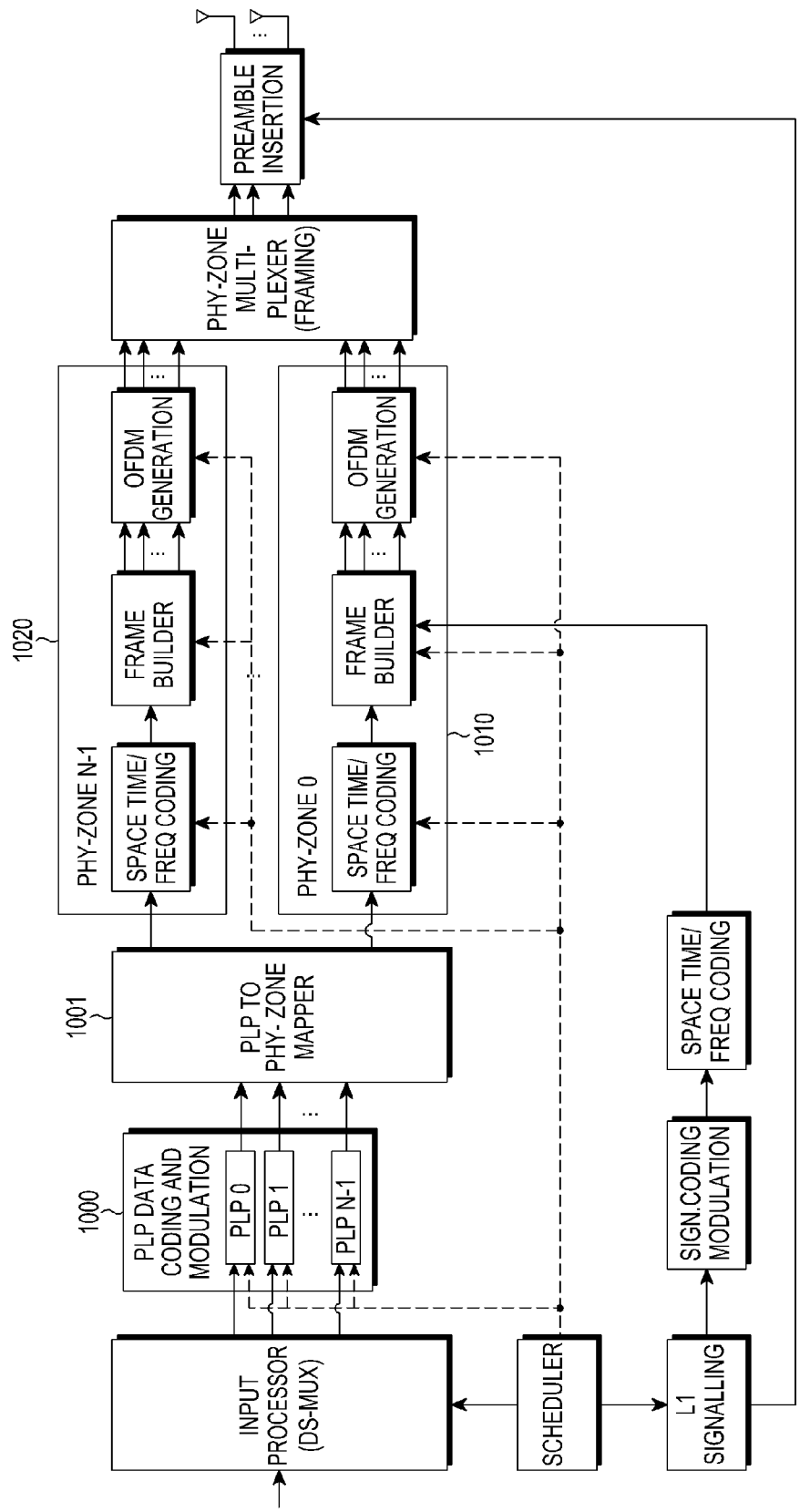
FIG. 10 is a schematic diagram illustrating a transmitter according to an embodiment of the invention.

FIG. 10 illustrates a variant of a transmitter according to an embodiment of the invention.

In contrast to the transmitter of FIG. 4, where the service splitter 401 maps the services to the PHY zones, a PLP-PHY zone mapper 1001 of FIG. 10, instead of the service splitter 401, is positioned after a data coding and modulation unit 1000 to map PLPs to PHY zones.

According to the above-described concept of different efficiency PHY-zones, there is a need for an efficient way to handle the corresponding signaling. Since certain embodiments of the present invention classify the PHY-zones with respect to some key parameters of strong impact on the efficiency-performance trade-off, such as the FFT-size or MIMO scheme, many of the PHY configuration parameters would remain the same across the different zones. In view of this classification, it may be more efficient to combine the signaling of the different modes rather than separate the modes by time, such as according the embodiment of the present invention described with reference to FIG. 2. FIG. 1 illustrates a frame structure according to this more efficient form of multiplexing. The placement of the PHY-zones (i.e., the physical layer zones) is not performed randomly, but rather sequentially by increasing order of the mode efficiency (from lowest to highest efficiency modes).

In the context of a DVB-T2 system, the FFT size may be selected as the key differentiating PHY configuration between the different zones. Alternatively or in addition, other alternative PHY parameters (e.g. MIMO scheme) may be used to achieve the PHY-zoning.

Figure 5:
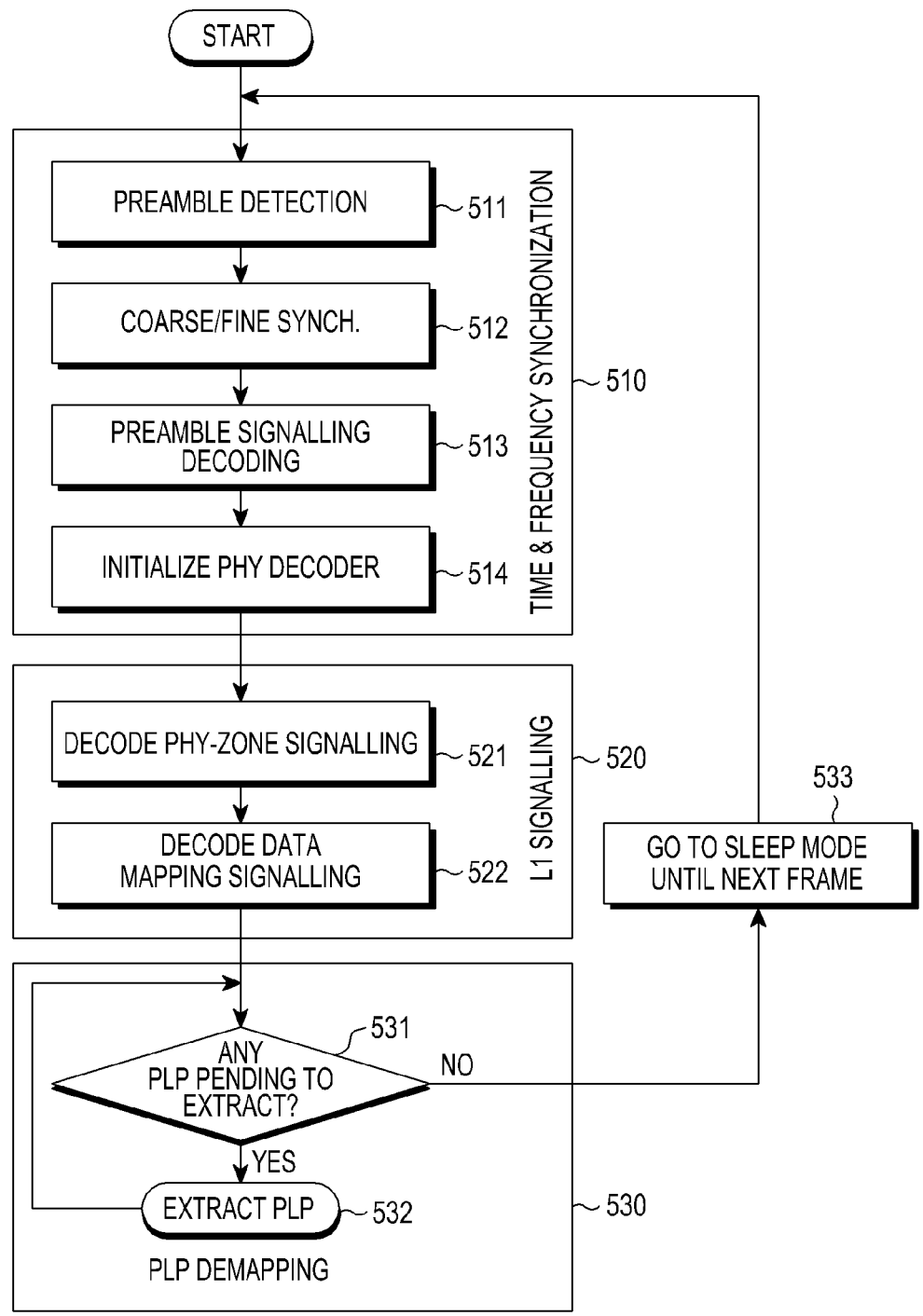
FIG. 5 is a flow diagram illustrating a conventional receiver.
Figure 6:
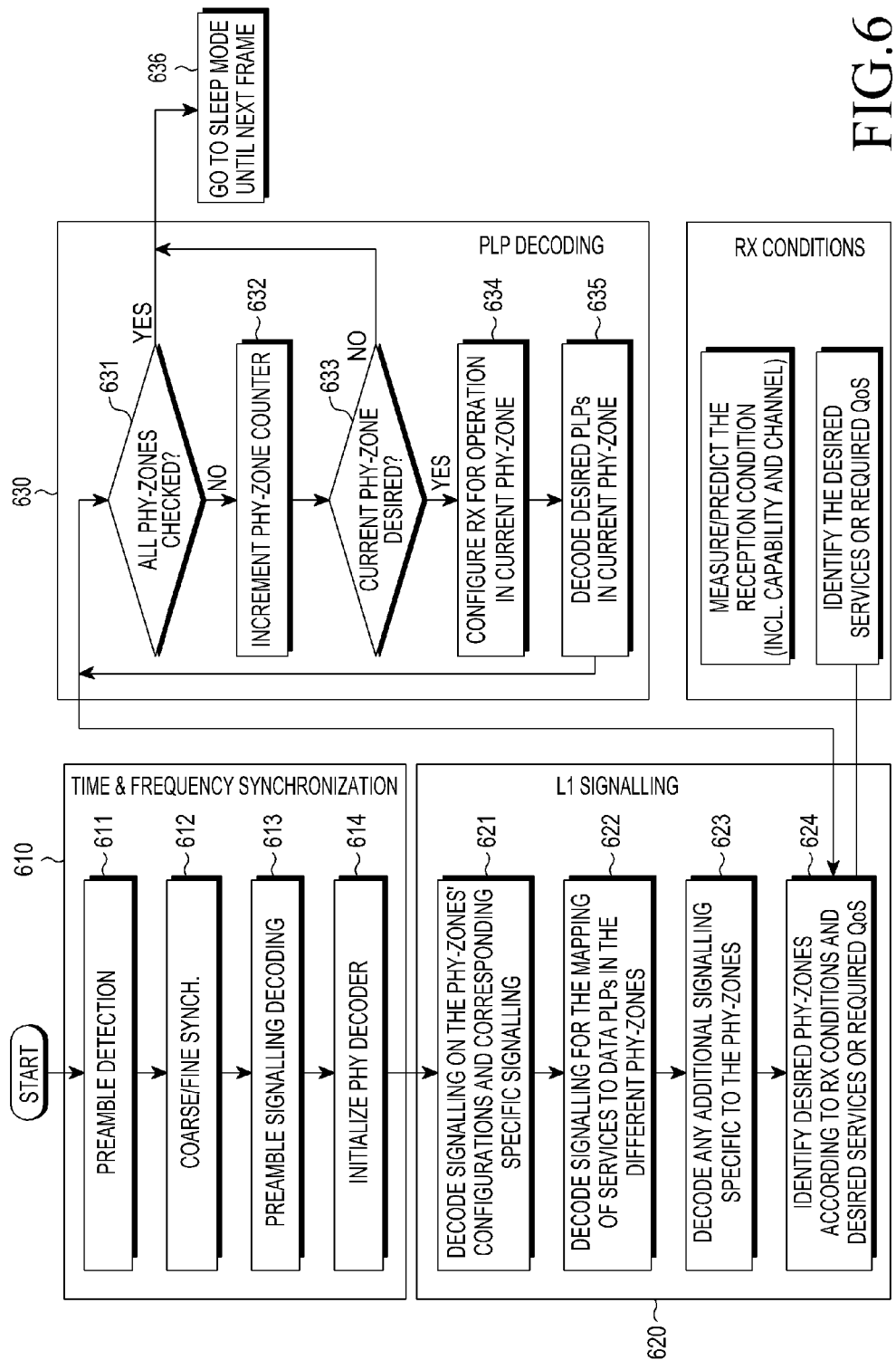
FIG. 6 is a flow diagram illustrating a receiver according to an embodiment of the invention.

FIG. 5 is flowchart illustrating conventional receiver operations a. FIG. 6 is a flowchart illustrating receiver operations according to an embodiment of the invention.

Referring to FIG. 5, a conventional receiver starts performs time and frequency synchronization together and initializes the PHY decoder, in step 510. More specifically, the receiver detects a preamble in step 511, acquires synchronization in step 512, decodes preamble signaling in step 513, and initializes the PHY decoder in step 514.

The receiver decodes the L1 signaling in step 520. More specifically, the receiver decodes physical zone signaling in step 521 and decodes data mapping signaling in step 522, such that the receiver knows where to find its desired Physical Layer Pipe (PLP) (i.e., physical layer section) carrying the data. Thereafter, the receiver performs PLP demapping in step 530. More specifically, in step 531, the receiver determines whether there is a PLP to extract from the current frame. If the receiver has a PLP to extract from the current frame, the receiver looks for the PLP as signaled in the decoded signaling, extracts and consumes the PLP, i.e., processes the data carried in the PLP for use by a user of the receiver, for example by displaying a video image on a screen. This operation is performed in contrast to conventional operations, where the frame is composed of only one single mode. If there is no PLP to extract from the current frame in step 531, the receiver goes to step 533 to operate in a sleep mode until a next frame.

FIG. 6 illustrates the operation of the receiver according to an embodiment of the invention.

Referring to FIG. 6, in step 610, which is similar to step 510 of FIG. 5, the receiver performs time and frequency synchronization, and then initializes its PHY decoder. More specifically, steps 611 through 614 are similar to steps 511 through 514.

In step 620, the receiver decodes the signaling that will provide information on the configurations of the PHY-zones and information necessary to find and decode corresponding signaling for data (i.e., PLP) mapping to services. More specifically, the receiver decodes particular signaling corresponding to the information regarding the configuration of the PHY-zones, in step 621, decodes signaling for mapping of services to data PLPs of other PHY-zones in step 622, and decodes particular additional signaling for PHY-zones in step 623. In step 624, the receiver identifies desired PHY-zones according to the receiver's state and a desired service or required QoS.

After decoding signaling in step 620, the user may be informed of the configurations of the PHY-zones and associated services, as well as PLPs through PLP decoding, in step 630. More specifically, if all PHY-zones are checked in step 631, the receiver proceeds to step 636 to operate in the sleep mode until the next frame. However, if the PHY-zones are not all checked, the receiver proceeds to step 632 to increase the counter of the PHY-zone. If the current PHY-zone is not required, the receiver proceeds to step 636. If the current PHY-zone is required, the receiver proceeds to step 634 to configure reception for an operation in the current PHY-zone. The receiver then decodes desired PLPs in the current PHY-zone in step 635, and returns to step 631.

This information in combination with the known reception conditions of the receiver (including both receiver capability and channel conditions) and desired services or required QoS (quality of service) will lead to the proper extraction and decoding of the desired PLPs in the desired PHY-zones.

For example, in the context of two PHY-zones, SEM and HEM as mentioned above, a receiver with standard reception conditions may only be able to consume services in the SEM mode, whereas another receiver with better conditions would be able to consume services in both SEM and HEM modes if required. According to an example of graceful degradation with Scalable Video Coding (SVC), a receiver in standard conditions will be able to consume the SVC base layer, whereas the one with favorable conditions may detect both the base and enhanced SVC layers respectively in the SEM and HEM modes, and then combine these service components for the service consumption of the desired high QoS.

Compared to existing broadcasting technology, embodiments of the invention may include multiplexing of different efficiency PHY-zones within the same frame. The PHY-zones are distinguished according to some key PHY configuration parameters with direct impact on the performance-efficiency trade-off, such as FFT size and MIMO scheme.

In view of this characterization of the PHY-zones, signaling of the PHY-zones may be efficiently implemented according to an embodiment of the invention by defining a signaling zone at the beginning of the frame, which gathers the signaling of all PHY zones and reduces (or reuses) the redundancy. This implementation moves the adaptation from the transmitter (or system) side to the receiver (user) side, as the broadcasting systems cannot adapt to the different reception conditions of the different users, unlike typical uni-cast cellular wireless systems.

At the receiver side, according to an embodiment of the invention, the receiver monitors its reception conditions as dictated by its capabilities and channel conditions. This monitoring enables the receiver to access the services in the efficiency mode or modes most suitable to the user's conditions and requirements. In the prior art technology, the receiver typically operates in a slave mode, and thus, is not able to choose higher efficiency/resolution services according to its own capabilities.

A limitation of prior art unidirectional broadcast systems can be seen in terms of the limited efficiency-robustness trade-off that can be achieved, especially for mobile environments. By contrast, cellular mobile communication systems in the prior art make use of adaptation and resources allocation schemes, such as adaptive modulation and coding, which make use of knowledge of the users' channel state or signal quality available to the system through the reverse channel.

According an embodiment of the present invention, instead of the system directly adapting its resources, for example to the users' conditions, such as typically performed in cellular mobile communications systems having a reverse channel, according to an embodiment of the present invention, the system is allowed to enable, in an efficient manner, the users to adapt to the system by adequately selecting/consuming the system services/resources according to their channel conditions and receiver capabilities, for example, by efficient multiplexing of different PHY-zones.

According an embodiment of the invention, the definition and efficient multiplexing of different efficiency PHY-zones is performed by associating each zone to few key PHY configuration parameters that have direct impact on the system performance-robustness trade-off (e.g., FFT size, MIMO scheme, guard interval, pilot signal distribution). Thus, the selection of these key PHY parameters is brought down to the single frame for the same deployment instead of different deployments, such as in the current state of the art. This selection enables a finer granularity to enhance the system performance by allowing the users to adapt to the services' requirements and users' conditions (receiver capability, mobility, number of antennas, etc.). Then, the receiver decides which part of the frame is decoded.

According to an embodiment of the present invention, the signaling of all PHY-zones is combined into a signaling area where overhead reduction or equivalently further robustness can be achieved. The zones may be placed in time order from the lowest to the highest efficiency.

The mapping of services to the different zones may be performed in such a manner so as not to lose any capacity (e.g., by duplicating services) by multiplexing the services across the zones. This multiplexing in particular provides benefits for SVC, where the base layer service component can be sent through a standard efficiency mode, whilst the enhanced layer service component can be sent through a high efficiency mode.

A further advantage of embodiments of the present invention is allowing fixed and mobile broadcasting services to converge efficiently into the same signal. For example, fixed and low mobility receivers could be addressed using a PHY-zone with large FFT, whereas a smaller FFT (i.e., fewer OFDM sub-carriers) may be provided for, in particular, high mobility receivers. This approach is particularly beneficial if services transmitted to fixed and mobile receivers have a large number of commonalities (such as sharing some of the components of one service) and source coding techniques such as SVC are used.

The above advantages may be obtained at the cost of some increase in complexity and in overhead. However, this increase is typically a minor disadvantage in comparison to the benefits offered by embodiments of the present invention in terms of flexibility and better system performance-efficiency trade-off as a result of the enabled adaptation to the services' requirements and users' conditions.

An embodiment of the invention will now be described in more detail in the context of a DVB-T2 (Digital Video Broadcasting 2) system, in particular, in relation to signaling as follows.

Differences between prior art signaling and signaling according to embodiments of the present invention apply at least to the "P1" symbol and "L1-Post" as known in the art. According to embodiments of the present invention described herein, the FFT size is the PHY configuration parameter associated to each PHY-zone.

P1 symbols transmitted at the beginning of each frame are used for: i) system/signal identification, ii) estimation of the frequency offset, and iii) signaling the FFT size. More specifically, P1 is divided into S1 and S2 fields, with 3 and 4 bits respectively, and the S2 field is further divided into S2 field-1 (with 3 bits) and S2 field-2 (with one single bit).

Details of conventional DVB-T2 specification of the P1 symbols are included in the following Table 1 and Table 2 for S1 and S2 field-1. Table 1 refers to DVB-T2 S1 field signaling, and Table 2 refers to DVB-T2 S2 field signaling.

The S2 field-2 (also known as mixed bit) indicates whether the P1 preambles in the current transmission are all of the same type as this preamble or whether different preambles are interleaved having at least one T2 preamble in the superframe (period of frames during which the frame format as well as the list of PLPs that can be allocated is fixed).

TABLE 1

| S1 | | | |
|---|---|---|---|
| $S1_2$ | $S1_1$ | $S1_0$ | Description |
| 0 | 0 | 0 | T2_SISO |
| 0 | 0 | 1 | T2_MISO |
| 0 | 1 | 0 | Reserved for future use |
| 0 | 1 | 1 | |
| 1 | 0 | 0 | |
| ... | | | |
| 1 | 1 | 1 | |

TABLE 2

| S2 | | | Description |
|---|---|---|---|
| $S2_3$ | $S2_2$ | $S2_1$ | (FFT size) |
| 0 | 0 | 0 | 1K |
| 0 | 0 | 1 | 2K |
| 0 | 1 | 0 | 4K |
| 0 | 1 | 1 | 8K |
| 1 | 0 | 0 | 16K |
| 1 | 0 | 1 | 32K |
| 1 | 1 | 0 | Reserved for future use |
| 1 | 1 | 1 | |

As previously discussed, the PHY-zones may have to be transmitted in order of increasing efficiency (thus providing decreasing robustness). In terms of the FFT-size, use of this transmission order means that the FFT-length used during the first PHY-zone may be also the lowest used in the current frame. Furthermore, the PHY-zones may be arranged in order of increasing FFT-size in order to simplify the hardware implementation.

This arrangement would allow: transmission of L1-Signaling using the shortest FFT size used (thus with the most robust FFT mode); placement of the receiver to sleep for those PHY-zones where the FFT is too large according to the measured Doppler (thus achieving some power saving); and use of a single FFT module at the receiver which is power efficient during the entire frame. To enable this use of the single FFT module, a signaling scheme for the P1 symbol enabling the receivers to know in advance the FFT size used in the different zones according to embodiments of the present invention.

In view of the limited capacity of P1 symbols (7 bits), the embodiment of the invention signals the size of the smallest and the largest, i.e. highest order, FFT used in the frame. As a result, two new fields are defined into S1 and S2, referred as L-field and H-field having 2 bits each. The position of these bits into the P1 symbol is indicated in Table 3 below.

Table 3 shows P1 signaling in an embodiment of the present invention.

The L-field may be used to indicate the size of the smallest FFT $N_{low} \in [1K, 2K, 4K, 8K]$ while the H-field may indicate the size of the largest FFT using a multiplicative factor $R \in [1, 2, 4, 32]$ so that the largest FFT is obtained as $N_{high} = N_{low} \times R$. Although in this scheme not all combinations of $N_{low}$, $N_{high}$ FFT sizes can be signaled, the scheme is able to cover most of the possible combinations.

Table 4 indicates for each value of $N_{low}$, an $N_{high}$ value that can then be signaled, and shows all possible $N_{low}$ and $N_{high}$ combinations with L-field equal to 1K, 2K, 4K or 8K, and H-field equal to 1K, 2K, 4K and 32K.

TABLE 4

| | $N_{high}$ | | | | | |
|---|---|---|---|---|---|---|
| | 1K | 2K | 4K | 8K | 16K | 32K |
| $N_{low}$ = 1K | ✓ | ✓ | ✓ | ~ | ~ | ✓ |
| $N_{low}$ = 2K | — | ✓ | ✓ | ✓ | ~ | ✓ |
| $N_{low}$ = 4K | — | — | ✓ | ✓ | ✓ | ✓ |
| $N_{low}$ = 8K | — | — | — | ✓ | ✓ | ✓ |
| $N_{low}$ = 16K | — | — | — | — | ✓ | ✓ |
| $N_{low}$ = 32K | — | — | — | — | — | ✓ |

Since FFT-sizes greater than 32K are not possible, any value above 32K is actually clipped to 32K. Typically, FFT sizes larger than 8K may be too large for mobile users; therefore, selecting 8K as the maximum value for $N_{low}$ should cover typical scenarios. As a result, the cases of 1K/8K, 1K/16K and 2K/16K combinations may not be covered. In these cases, the largest 32K case could be signaled still allowing the receiver to decode the 8K and 16K zones.

Since the PHY-zones are sorted in an increasing order of the FFT-size, the number and characteristics of the P2 symbols are automatically determined once the lowest FFT size is known.

Since L1-Pre signals the information for the first zone (and other system parameters), L1-Pre is typically the same regardless of the number of zones.

L1-Post typically contains parameters that allow the receiver to decode the desired physical layer pipes and is typically divided into Configurable, Dynamic and Extension fields. In order to maintain backwards-compatibility with conventional DVB-T2, the signaling regarding the additional zones according to embodiments of the present invention may be encapsulated into the L1-Post Extension field. The following fields are then transmitted (indicative number of bits derived from DVB-T2). Table 5 indicates signaling included into the L1-Post Extension according to an embodiment of the present invention.

TABLE 3

| $S1_2$ | $S1_1$ | $S1_0$ | $S2_3$ | $S2_2$ | $S2_1$ | $S2_0$ (Mixed Bit) | |
|---|---|---|---|---|---|---|---|
| 0 | 0 | x | x | x | x | Same as in T2 | T2_SISO/T2_MISO operation |
| 0 | 1 | x | x | x | x | | Reserved |
| 1 | 0 | L-Field | | H-Field | | | New SISO (applying the invention) |
| 1 | 1 | | | | | | New_MIxO (applying the invention) |

TABLE 5

NUMBER_OF_ZONES (Z bits): Indicate the number of additional ZONES (zones after the first zone).
for (i=1.. NUMBER_OF_ZONES){
    ZONE_LENGTH (12 bits): indicates the length of the i-th zone in terms of OFDM symbols.
    PILOT_PATTERN (4 bits): indicates the pilot pattern used in the i-th zone.
    FFT_size (3 bits): indicates the FFT size of the i-th zone.
    GI (3 bits): indicates the guard interval used during the i-th zone.
    PAPR (4): indicates the PAPR scheme used in the i-th zone.
    SUBSLICE_INTERVAL (22 bits): number of OFDM cells from the start of one sub-slice of one PLP to the start of the next sub-slice of the same PLP.
    TYPE2_START (22 bits): start position of the first of the type 2 PLPs in the i-th zone.
    NUM_AUX (4 bits): number of Auxiliary Streams in current zone.
    for (j=1.. NUMBER_OF_ZONES){
        AUX_Reserved (96 bits): these bits are reserved for future use for signaling auxiliary streams in j-th zone.
    }
}

The previous loop, which is a function of the number of zones, typically gathers all the signaling transmitted in L1-Pre and L1-Post that might be different from one zone to another. Additionally, the Guard Interval length is typically signaled for each zone. However, the guard interval typically represents the same amount of samples for all the zones that would simplify the processes of cyclic prefix insertion and cyclic prefix removal.

When only one zone exists in the frame, the overhead incurred is typically negligible (may be equal to Z bits, i.e., the overhead indicated the number of zones).

Figure 7:
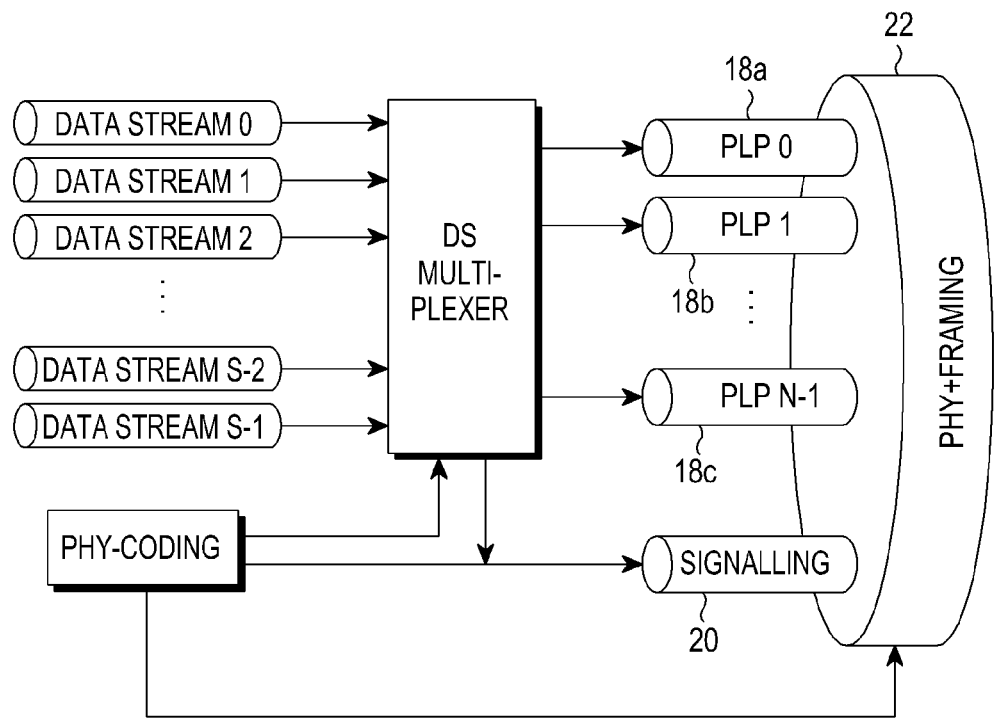
FIG. 7 is a schematic diagram illustrating conventional encapsulation of data streams in physical layer pipes.
Figure 8:
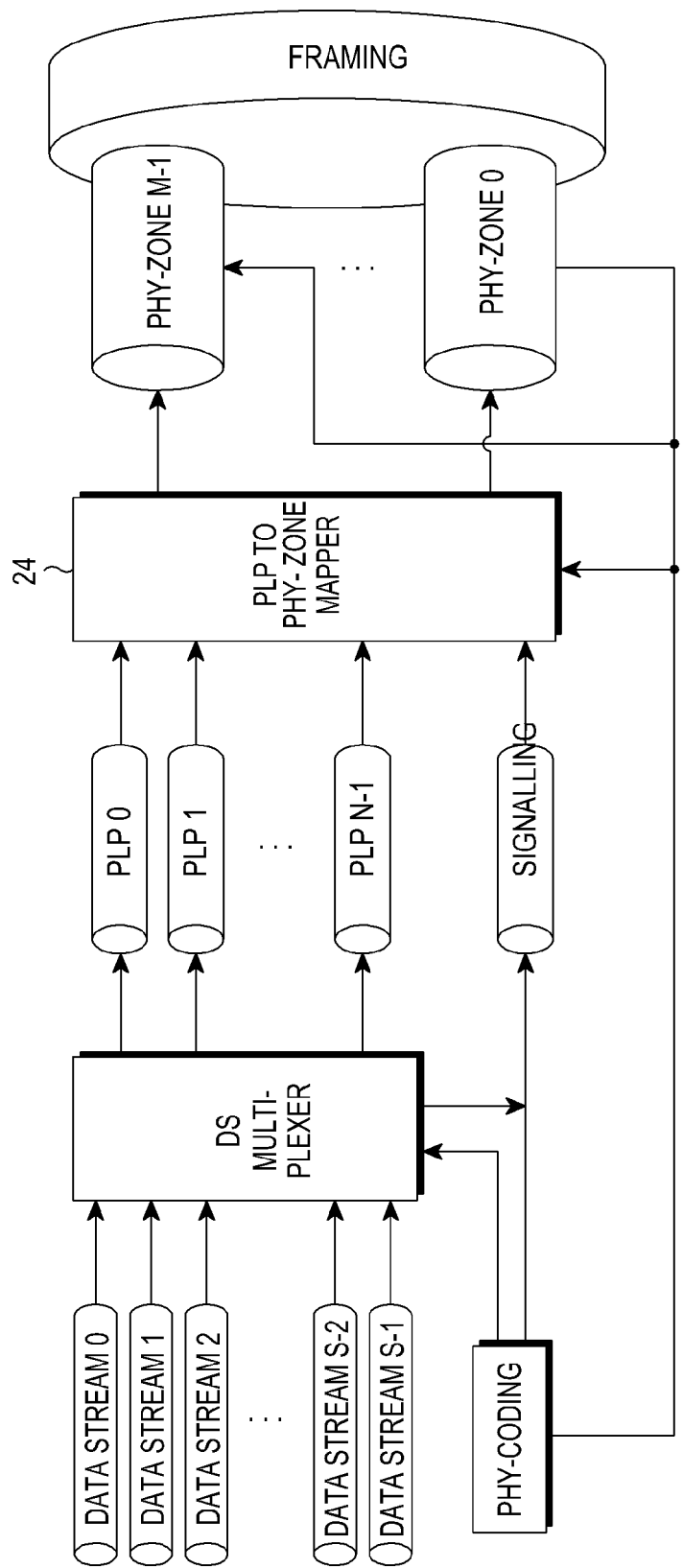
FIG. 8 is a schematic diagram illustrating multiplexing of physical layer pipes into different physical layer zones according to an embodiment of the invention.

FIG. 7 is a diagram illustrating a conventional relationship between a PHY-zone a PLP. FIG. 8 illustrates a relationship between a PHY-zone PLP according to an embodiment of the present invention.

As shown in FIG. 7, when there is only one PHY-zone, all PLPs 18a, 18b, 18c are mapped 22 into the PHY-zone jointly with the signaling information 20. Therefore, PLP Mapping and Framing is done in a single process.

However, according to an embodiment of the present invention, as shown in FIG. 8, when there is more than one PHY-zone, a PLP to PHY-zone Mapper 24 performs an additional mapping process. This additional mapping allows multiplexing the PLPs into the PHY-Zones. Afterwards, the PHY-Zones are encapsulated into one frame where necessary preambles are inserted. The signaling information is typically encapsulated in one of the PHY-zones, which is typically the first PHY-zone.

FIG. 11 is a diagram illustrating typical mapping of PLPs to PHY-zones according to an embodiment of the present invention.

Referring to FIG. 11, full flexibility is allowed in the mapping of the PLP to any PHY-zone. The position of the i-th PLPs into the PHY-zones is determined from at least the first cell occupied by the i-th PLP and the number of cells occupied. This information may be encapsulated into the Data Mapping signaling, which should be transparent regardless of how many PHY-zones exist in the current frame. The position may also be determined by the PHY-zones signaling, which specifies where each PHY-zone starts and ends. With this information, the receiver is then able to determine the PHY-zones allocated to each respective PLP.

According to embodiments of the present invention, PLPs may be mapped according to various options, including two options described as follows.

Firstly, PLPs may be transmitted across more than one PHY-Zone. This first option may incur higher complexity at the receiver, but may minimize the padding between the PHY-Zones. Secondly, a group of PLPs (as defined by the scheduler) may be transmitted in a corresponding single PHY-Zone. In this case, the receiver complexity may be reduced at the expense of requiring some padding at the end of each PHY-Zone. However, since the reception of all the PHY-Zones is not guaranteed or required, this mode may be suitable when the PLPs are time interleaved within the frame (e.g., Type-2 PLP specified in DVB-T2 standards). As a result, decoding one PLP in one PHY-Zone may not require any information from a different PHY-Zone. The signaling required does not change between the first and second options, thus the receiver may determine which mode has been selected, if, when decoding the signaling, the receiver detects that one PLP is transmitted over more than one PLP zone.

Embodiments of the present invention may be provided in a backwards-compatible form in unidirectional or bidirectional broadcasting systems. This may be accomplished by using reserved fields in the current standards. Using this approach of using reserved fields, the information about the additional PHY-Zones (i.e., PHY-Zones occurring after the first PHY-zone) may be encapsulated into these new fields. Then, by using the information from the data mapping, any PLP transmitted after the end of the first PHY-Zone would be transparent to legacy receivers.

As has been described, embodiments of the invention allow a receiver to select the system services and/or resources according to channel conditions, and according to receiver capabilities and service requirements.

Examples of parameters affecting the channel conditions include receiver mobility (mobile speed) or similar metrics that relate to the Doppler spread of the received signal; received signal strength (e.g., average Signal-to-Noise Ratio (SNR) or actual/instantaneous SNR); and interference and noise powers affecting the useful signal; transmit and/or receive antennas cross-correlation (when multiple antenna transmission is used).

Examples of parameters relating to receiver capability include receiver implementation (e.g., number of FFTs enabled, interference cancellation algorithm, scalable video decoding, etc.); number of antenna configurations; battery life; and screen display size and resolution.

Examples of service requirements include quality of service required for the desired services; standard or high definition services; and priority assigned to the different services transmitted.

The above embodiments are illustrative examples of embodiments of the present invention. It is to be understood that any feature described in relation to any one embodiment may be used alone, or in combination with other features described, and may also be used in combination with at least one features of any other of the embodiments, or any combination of any other of the embodiments. Furthermore, equivalents and modifications not described above may also be employed without departing from the scope of the invention, which is defined in the accompanying claims.

What is claimed is:

1. A method of transmitting data comprising a plurality of data streams in a broadcasting system, the method comprising:
    dividing a frame into a plurality of physical layer zones;
    allocating the plurality of data streams to the plurality of physical layer zones;
    allocating signaling information associated with the plurality of physical layers to at least one of the plurality of physical layer zones; and
    transmitting the frame to which the signaling information is allocated,
    wherein a Fast Fourier Transform (FFT) size of each respective physical layer zone is different between different physical layer zones, and the signaling information includes at least one of a smallest FFT size and a largest FFT size used in the frame.

2. The method of claim 1, wherein the signaling information comprises at least one of locations of the physical layer zones, characteristics of the physical layer zones, and allocation information of the data streams with respect to the physical layer zones.

3. The method of claim 2, wherein the characteristic of the physical layer zone comprises at least one of the number of sub-carriers of respective Orthogonal Frequency Division Multiplexing (OFDM) symbols, a length of a guard period between the OFDM symbols, a ratio of pilot sub-carriers to payload sub-carriers, and a multiple antenna transmission scheme.

4. The method of claim 2, wherein at least one first physical layer zone characteristic among the characteristics of the physical layer zones is applied uniformly within symbols of the respective physical layer zone and is applied differently between different physical layer zones.

5. The method of claim 1, wherein the signaling information is allocated to a front part of a first arranged physical layer zone in the frame.

6. An apparatus for transmitting data comprising a plurality of data streams in a broadcasting system, the apparatus comprising:
    a scheduler for dividing a frame into a plurality of physical layer zones, allocating the plurality of data streams to the plurality of physical layer zones, and allocating signaling information associated with the plurality of physical layers to at least one of the plurality of physical layer zones; and
    a transmitter for transmitting the frame to which the signaling information is allocated,
    wherein a Fast Fourier Transform (FFT) size of each respective physical layer zone is different between different physical layer zones, and the signaling information includes at least one of a smallest FFT size and a largest FFT size used in the frame.

7. The apparatus of claim 6, wherein the signaling information comprises at least one of locations of the physical layer zones, characteristics of the physical layer zones, and allocation information of the data streams with respect to the physical layer zones.

8. The apparatus of claim 7, wherein the characteristic of the physical layer zone comprises at least one of the number of sub-carriers of respective Orthogonal Frequency Division Multiplexing (OFDM) symbols, a length of a guard period between the OFDM symbols, a ratio of pilot sub-carriers to payload sub-carriers, and a multiple antenna transmission scheme.

9. The apparatus of claim 7, wherein at least one first physical layer zone characteristic among the characteristics of the physical layer zones is applied uniformly within symbols of the respective physical layer zone and is applied differently between different physical layer zones.

10. The apparatus of claim 6, wherein the signaling information is allocated to a front part of a first arranged physical layer zone in the frame.

11. A method of receiving data comprising a plurality of data streams in a broadcasting system, the frame being divided into a plurality of physical layer zones, the plurality of data streams being allocated to the plurality of physical layer zones, and signaling information associated with the plurality of physical layers being allocated to at least one of the plurality of physical layer zones, the method comprising:
    receiving the frame; and
    receiving the plurality of data streams by using the signaling information,
    wherein a Fast Fourier Transform (FFT) size of each respective physical layer zone is different between different physical layer zones, and the signaling information includes at least one of a smallest FFT size and a largest FFT size used in the frame.

12. The method of claim 11, wherein the signaling information comprises at least one of locations of the physical layer zones, characteristics of the physical layer zones, and allocation information of the data streams with respect to the physical layer zones.

13. The method of claim 12, wherein the characteristic of the physical layer zone comprises at least one of the number of sub-carriers of respective Orthogonal Frequency Division Multiplexing (OFDM) symbols, a length of a guard period between the OFDM symbols, a ratio of pilot sub-carriers to payload sub-carriers, and a multiple antenna transmission scheme.

14. The method of claim 12, wherein at least one first physical layer zone characteristic among the characteristics of the physical layer zones is applied uniformly within symbols of the respective physical layer zone and is applied differently between different physical layer zones.

15. The method of claim 11, wherein the signaling information is allocated to a front part of a first arranged physical layer zone in the frame.

16. An apparatus for receiving data comprising a plurality of data streams in a broadcasting system, the frame being divided into a plurality of physical layer zones, the plurality of data streams being allocated to the plurality of physical layer zones, and signaling information associated with the plurality of physical layers being allocated to at least one of the plurality of physical layer zones, the apparatus receiving the frame and receiving the plurality of data streams by using the signaling information,
    wherein a Fast Fourier Transform (FFT) size of each respective physical layer zone is different between different physical layer zones, and the signaling information includes at least one of a smallest FFT size and a largest FFT size used in the frame.

17. The apparatus of claim 16, wherein the signaling information comprises at least one of locations of the physical layer zones, characteristics of the physical layer zones, and allocation information of the data streams with respect to the physical layer zones.

18. The apparatus of claim 17, wherein the characteristic of the physical layer zone comprises at least one of the number of sub-carriers of respective Orthogonal Frequency Division Multiplexing (OFDM) symbols, a length of a guard period between the OFDM symbols, a ratio of pilot sub-carriers to payload sub-carriers, and a multiple antenna transmission scheme.

19. The apparatus of claim 17, wherein at least one first physical layer zone characteristic among the characteristics of the physical layer zones is applied uniformly within symbols of the respective physical layer zone and is applied differently between different physical layer zones.

20. The apparatus of claim 16, wherein the signaling information is allocated to a front part of a first arranged physical layer zone in the frame.

\* \* \* \* \*